United States Patent
Zhou et al.

(10) Patent No.: US 11,618,682 B2
(45) Date of Patent: Apr. 4, 2023

(54) MIXED SLURRY OF STRONG AND WEAK GRAPHENE OXIDES AND PREPARATION METHOD OF MIXED SLURRY, AND COMPOSITE FILM OF STRONG AND WEAK GRAPHENE OXIDES AND PREPARATION METHOD OF COMPOSITE FILM

(71) Applicant: CHANGZHOU FUXI TECHNOLOGY CO., LTD, Jiangsu (CN)

(72) Inventors: Bucun Zhou, Jiangsu (CN); Renjie Zhou, Jiangsu (CN); Jing Lu, Jiangsu (CN); Dong Su, Jiangsu (CN); Zhaocheng Wang, Jiangsu (CN); Feng Li, Jiangsu (CN)

(73) Assignee: CHANGZHOU FUXI TECHNOLOGY CO., LTD, Jiangsu (CN)

(*) Notice: Subject to any disclaimer, the term of this patent is extended or adjusted under 35 U.S.C. 154(b) by 0 days.

(21) Appl. No.: 17/653,755

(22) Filed: Mar. 7, 2022

(65) Prior Publication Data

US 2022/0219991 A1 Jul. 14, 2022

Related U.S. Application Data

(63) Continuation of application No. PCT/CN2020/111173, filed on Aug. 26, 2020.

(30) Foreign Application Priority Data

Sep. 6, 2019 (CN) .......................... 201910840143.6

(51) Int. Cl.
| | | |
|---|---|---|
| *C01B 32/198* | (2017.01) | |
| *B05D 1/42* | (2006.01) | |
| *B05D 3/02* | (2006.01) | |
| *B05D 3/12* | (2006.01) | |
| *C09K 5/08* | (2006.01) | |

(52) U.S. Cl.
CPC .............. *C01B 32/198* (2017.08); *B05D 1/42* (2013.01); *B05D 3/0254* (2013.01); *B05D 3/12* (2013.01); *C09K 5/08* (2013.01); *B05D 2401/20* (2013.01); *C01B 2204/24* (2013.01); *C01B 2204/28* (2013.01); *C01P 2006/32* (2013.01); *C01P 2006/80* (2013.01); *C01P 2006/90* (2013.01)

(58) Field of Classification Search
None
See application file for complete search history.

(56) References Cited

U.S. PATENT DOCUMENTS

| | | |
|---|---|---|
| 9,561,955 B2 | 2/2017 | Zhamu et al. |
| 2013/0087446 A1 | 4/2013 | Zhamu et al. |

FOREIGN PATENT DOCUMENTS

| | | | |
|---|---|---|---|
| CN | 106115676 A | | 11/2016 |
| CN | 106520079 A | | 3/2017 |
| CN | 106563362 A | | 4/2017 |
| CN | 107140619 | * | 9/2017 |
| CN | 108203091 A | | 6/2018 |
| CN | 108314024 A | | 7/2018 |
| CN | 108367914 A | | 8/2018 |
| CN | 108513570 A | | 9/2018 |
| CN | 108864790 A | | 11/2018 |
| CN | 108996496 A | | 12/2018 |
| CN | 110482539 A | | 11/2019 |
| WO | 2017068350 A1 | | 4/2017 |

* cited by examiner

*Primary Examiner* — Sheng H Davis
(74) *Attorney, Agent, or Firm* — Novick, Kim & Lee, PLLC; Allen Xue

(57) ABSTRACT

Provided are a slurry of graphene oxides with different degrees of oxidation, a composite film of graphene oxides, and a graphene heat-conducting film. The slurry of the graphene oxides comprises the graphene oxides and a solvent, and the graphene oxides include a strong graphene oxide and a weak graphene oxide, wherein the slurry comprises two graphene oxides with different degrees of oxidation, which can increase a carbon content in the graphene oxide per unit mass, so that the finally obtained graphene heat-conducting film has more carbon.

14 Claims, 5 Drawing Sheets

MIXED SLURRY OF STRONG AND WEAK GRAPHENE OXIDES AND PREPARATION METHOD OF MIXED SLURRY, AND COMPOSITE FILM OF STRONG AND WEAK GRAPHENE OXIDES AND PREPARATION METHOD OF COMPOSITE FILM

TECHNICAL FIELD

The present invention relates to the field of materials, and particularly relates to a process for preparing a graphene heat-conducting film from graphene oxides.

BACKGROUND ART

Graphene has a very good heat-conducting property and wide application prospects. It is a commonly used process for preparing a graphene heat-conducting film by arranging and assembling a graphene oxide into a graphene oxide film and then performing high-temperature treatment. The graphene heat-conducting film prepared by this method is a highly oriented heat-conducting film formed by stacking multiple layers of graphene, has the characteristics of being good in mechanical property, high in heat-conducting coefficient, light in weight, thin in material, good in flexibility and the like, and can solve the heat dissipation problems in the industries of electronics, aerospace, medical treatment and the like.

The graphene oxide used in the prior art is a graphene oxide obtained by chemical oxidation of graphite, has abundant oxygen-containing functional groups, and generally has a carbon content of about 50%. Such graphene oxide has good arrangement and assembly properties, but when the graphene oxide is used to prepare the graphene heat-conducting film, the heat-conducting film finally obtained per unit mass of the graphene oxide has less carbon, which increases the cost and is not conducive to industrial production. The content of the background art is merely a technology known to the inventors and does not of course represent the prior art in this field.

SUMMARY OF THE INVENTION

In view of one or more of the problems in the prior art, the present invention provides a slurry of graphene oxides, and the slurry comprises two graphene oxides with different degrees of oxidization, which can increase a carbon content in the graphene oxide per unit mass, so that a finally obtained heat-conducting film of graphene has more carbon.

Based on the above-mentioned purposes, the present invention provides a mixed slurry of strong and weak graphene oxides, comprising graphene oxides and a solvent, and the graphene oxides include a strong graphene oxide and a weak graphene oxide.

The strong graphene oxide of the present invention refers to a graphene oxide with a strong degree of oxidation, and the weak graphene oxide refers to a graphene oxide with a weak degree of oxidation.

The graphene oxide is obtained by adding some substances and structures between layers of graphite to strip away graphite sheet layers, and only to a certain degree of intercalation and oxidation can it be stripped to obtain very thin sheet layers (3 layers and below). The graphene oxide is high in degree of oxidation, large in number of oxygen-containing functional groups, thinner in sheet layer after striping, more orderly when being assembled into a film and better in assembly effect, but a carbon content of the strong graphene oxide is low, and graphene obtained after high-temperature treatment is relatively small in amount. A carbon content of the weak graphene oxide is high, and graphene obtained after high-temperature treatment is relatively large in amount; however, due to the weak degree of oxidation, it is only oxidized on an edge of a graphite sheet, a graphene oxide with a relatively small number of sheet layers cannot be obtained by stripping, and it is also very difficult to prepare a graphene oxide with a weak degree of oxidation and a small number of layers after stripping through experiments. The weak graphene oxide is low in degree of oxidation, small in number of oxygen-containing functional groups and large in number of layers during stripping, if only the weak graphene oxide is assembled for film formation, a highly oriented structure is not obtained during film formation, and orderliness is not good, thereby affecting the improvement of a heat-conducting coefficient of a graphene heat-conducting film obtained after high-temperature treatment.

It is very difficult to control the degree of oxidation in a preparation process of the graphene oxide. At present, it is difficult to prepare a graphene oxide with a degree of oxidation between a strong degree of oxidation and a weak degree of oxidation, and assembly of the graphene oxide during film formation can be affected and the heat-conducting coefficient of the graphene heat-conducting film prepared after final high-temperature treatment is greatly affected if the degree of oxidation of the graphene oxide slightly decreases and the sheet layer is stripped not well. Therefore, selecting a graphene oxide with a single degree of oxidation is not compatible to obtain a graphene heat-conducting film with a large amount of residual graphene and a good heat-conducting property.

The present invention provides a mixed slurry of strong and weak graphene oxides, and when orderliness of assembly for film formation is not greatly affected, the graphene heat-conducting film after high-temperature treatment is large in amount and the heat-conducting property of the graphene heat-conducting film is good.

According to one aspect of the present invention, a solid content of the graphene oxide is 5-8%.

According to one aspect of the present invention, the weak graphene oxide accounts for 5-50% of the graphene oxide by mass, preferably 5-30%, further preferably 10-30%.

According to one aspect of the present invention, a carbon content of the strong graphene oxide is 45-55%.

Preferably, a carbon content of the weak graphene oxide is 80-90%.

The carbon content of the weak graphene oxide is selected in a range of 80-90%, and because a graphene oxide with an excessively high carbon content is large in number of layers during stripping, the orderliness will become poor during assembly.

According to one aspect of the present invention, the solvent includes one or a mixed solvent of two or more of water, NMP and DMF.

Different from graphene containing no oxygen-containing functional groups, the two graphene oxides with different degrees of oxidation are mixed in the solvent, because the two graphene oxides both contain hydrophilic oxygen-containing functional groups on surfaces, and both of them have negative charges, they repel each other in the solvent, and are not likely to be agglomerated, and good mutual dispersion properties are achieved.

The present invention further provides a preparation method of a mixed slurry of strong and weak graphene oxides, specifically comprising the following steps:

preparing a strong graphene oxide dispersion liquid and a weak graphene oxide dispersion liquid respectively, mixing the strong graphene oxide dispersion liquid and the weak graphene oxide dispersion liquid, and dispersing to obtain the mixed slurry of the strong and weak graphene oxides.

Theoretically, the strong graphene oxide and the weak graphene oxide are not likely to be agglomerated in a solution because the functional groups on the surface have negative charges —COOH and thus they repel each other. However, an agglomeration problem still occurs in actual production and the stability of an obtained slurry is still not ideal enough. After multi-directional analysis, the inventors of the present application find that agglomeration is not caused by problems such as a particle size, specific surface and oil absorption value of the graphene oxide, but the charge presented by the graphene oxide in the slurry affects a system. Since the graphene oxide dispersion liquid is acidic due to the —COOH group, it is necessary to add alkali into the dispersion liquid for neutralization during dispersing. If the two graphene oxides are directly mixed and then the alkali is added, since the two graphene oxides have different degrees of oxidation and different amounts of —COOH contained on their structures, when the alkali is added for neutralization, a reaction will be uneven, resulting in poor dispersing. By changing a process procedure, the two graphene oxides are first dispersed well respectively, the —COOH groups on the graphene oxides are fully neutralized, and then the two are mixed, thus avoiding the above-mentioned problem of uneven dispersing. Therefore, the two graphene oxides are first dispersed in the solvent respectively, and the —COOH of the graphene oxides is sufficiently neutralized, and then the two are mixed, so that the two graphene oxides in a mixed liquid are not likely to be agglomerated.

According to one aspect of the present invention, a preparation method of the strong graphene oxide dispersion liquid comprises: dispersing a graphene oxide prepared by a chemical oxidation method into the solvent to obtain the strong graphene oxide dispersion liquid.

Preferably, in the chemical oxidation method, graphite reacts in a strong acid solution with an oxidizing agent to obtain the graphene oxide.

Further preferably, the chemical oxidation method comprises a Brodie method, a Staudenmaier method and a Hummers method.

According to one aspect of the present invention, in the strong graphene oxide dispersion liquid, a solid content of the strong graphene oxide is 3-8%.

Preferably, in the weak graphene oxide dispersion liquid, a solid content of the weak graphene oxide is 7-11%.

Since the weak graphene oxide contains less oxygen-containing functional groups and bonds with less solvent, it is easier to obtain a high-concentration slurry; since the number of the layers of the weak graphene oxide after stripping is greater than the number of the layers of the strong graphene oxide after stripping, it is possible to obtain the weak graphene oxide dispersion liquid with a relatively high solid content.

According to one aspect of the present invention, a mixed liquid of the strong graphene oxide dispersion liquid and the weak graphene oxide dispersion liquid is dispersed at a high speed, and a linear velocity of dispersing is 50-300 m/s, preferably 100 m/s.

The present invention further provides a composite film of strong and weak graphene oxides, comprising a strong graphene oxide and a weak graphene oxide, a content of the weak graphene oxide being 5-50%, preferably 5-30%, further preferably 10-30%.

Because a stripping degree of the strong graphene oxide is good, it can help the weak graphene oxide to assemble orderly; because the carbon content of the weak graphene oxide is high, the graphene heat-conducting film prepared from the composite film of the graphene oxides per unit mass increases, and cost is saved. If only the strong graphene oxide is used to prepare the graphene heat-conducting film, the heat-conducting coefficient of the finally obtained graphene heat-conducting film is high, but a thickness of the graphene heat-conducting film is small; if only the weak graphene oxide is used to prepare the graphene heat-conducting film, or the content of the weak graphene oxide is too high, since it is very difficult to strip the graphene oxide with the weak degree of oxidization to obtain a graphene oxide with a small number of layers (less than 10 layers), the orderliness during assembly is not good, and the heat-conducting coefficient of the graphene heat-conducting film after final heat treatment is low; if only a graphene oxide with an intermediate degree of oxidization is used, the degree of oxidization thereof is lower than that of the strong graphene oxide, and the assembly of the graphene oxide is affected due to reduction of the degree of oxidization, eventually resulting in that the heat-conducting coefficient of the graphene heat-conducting film after heat treatment is low. Therefore, by selecting the content of the weak graphene oxide to be 10-30%, the graphene heat-conducting film with a relatively high heat-conducting coefficient and a relatively high residual proportion of carbon can be obtained, so that the cost can be reduced to the maximum extent.

According to one aspect of the present invention, a grammage of the composite film of the graphene oxides is 100-250 g/m$^2$, preferably 180 g/m$^2$.

Preferably, a carbon content of the strong graphene oxide is 45-55%.

Preferably, a carbon content of the weak graphene oxide is 80-90%.

According to one aspect of the present invention, the strong graphene oxide and the weak graphene oxide of the composite film are directionally arranged in plane. In-plane directional arrangement means that the graphene oxide is assembled into the film by hydrogen bonds, and is directionally arranged in an assembled plane, so that heat of the graphene heat-conducting film after heat treatment can be transmitted in a direction of directional arrangement of graphene.

The present invention further provides a preparation method of a composite film of strong and weak graphene oxides, specifically comprising the following steps:

preparing a mixed slurry of the strong and weak graphene oxides by using the preparation method of the mixed slurry of the strong and weak graphene oxides; and defoaming, coating and drying the slurry to form the composite film of the strong and weak graphene oxides.

According to one aspect of the present invention, a continuous on-line defoaming machine is used for defoaming, and a rotating speed is 2000-3000 r/min.

Preferably, a feeding valve of the defoaming machine has an opening degree of 25-35%, preferably 30%.

Preferably, a vacuum negative pressure in the defoaming machine is 400-600 Pa, preferably 500 Pa.

According to one aspect of the present invention, a method of coating comprises knife coating and slot die coating, preferably knife coating, and further preferably, a coating machine is used for performing knife coating.

In a method of slot die coating, the slurry at a certain flow rate enters a die head inner cavity from an extruding head feeding port, and stable pressure is formed; finally the slurry is sprayed out of a die head slot outlet to be coated on a base material.

Knife coating is a coating mode in which a scraping knife is adopted for performing coating so as to make a thick coating film.

Preferably, a thickness of a wet film formed by coating is 2-5 mm, preferably 3 mm. Since the carbon content of the weak graphene oxide is high, the carbon residue value of the final heat-conducting film can be increased, so that a thicker graphene heat-conducting film can be obtained in the case of the same thickness of graphene oxide coating. If it is needed to prepare a graphene heat-conducting film of the same thickness, by using the method of the present invention, the thickness of the wet film formed by coating can be made smaller, and film production cost can be greatly reduced and efficiency can be improved.

Preferably, a speed of coating is 1-2 m/min, preferably 1.2 m/min.

According to one aspect of the present invention, a temperature of drying is 50-100° C., and time of drying is 0.5-1.5 h.

The present invention further provides a graphene heat-conducting film, and a heat-conducting coefficient of the graphene heat-conducting film is greater than 1000 W/m·K.

According to one aspect of the present invention, a density of the graphene heat-conducting film is 1.9-2.1 g/cm$^3$.

Preferably, a thickness of the graphene heat-conducting film is 30-100 The present invention further provides a preparation method of a graphene heat-conducting film, comprising the following steps:

preparing a composite film of strong and weak graphene oxides by using the preparation method of the composite film of the strong and weak graphene oxides;

performing high-temperature treatment on the composite film; and compacting the composite film after high-temperature treatment to obtain the graphene heat-conducting film.

Because the carbon content of the composite film of the graphene oxides is high, the amount of the graphene heat-conducting film after high-temperature treatment is large, which can greatly reduce the film production cost and improve the efficiency.

According to one aspect of the present invention, a method for performing high-temperature treatment on the composite film comprises: heating the composite film from a room temperature to 1000-3000° C., and performing treatment for 5-15 h.

Preferably, a heating rate is 0.2-5° C./min.

Further preferably, the heating rate is 1-1.5° C./min at 100° C. or less, the heating rate is 0.2-0.5° C./min at more than 100° C. and 300° C. or less, and the heating rate is 3-5° C./min at more than 300° C.

According to one aspect of the present invention, a compacting pressure is 10-30 MPa.

The present invention has the beneficial effects.

In the present invention, the graphene heat-conducting film is prepared by mixing the two graphene oxides with different degrees, the graphene oxide with the strong degree of oxidization has abundant functional groups and good assembly orderliness, and the graphene oxide with the weak degree of oxidization has a high carbon content, so that the prepared graphene heat-conducting film is thicker and the proportion of the final residual carbon is increased, which can improve the production efficiency and effectively reduce cost. Comparing a slurry of a graphene oxide with a strong degree of oxidization in the same concentration with the mixed slurry of the strong and weak graphene oxides of the present invention, it is only needed to form the wet film of 2 mm by coating the slurry of the present invention and then a 32 μm graphene heat-conducting film can be obtained, while a 31 μm graphene heat-conducting film can be obtained when it is needed to form a wet film of 4.5 mm by coating the slurry of the graphene oxide with the strong degree of oxidization; when the wet film of 4.5 mm is formed by coating the slurry of the graphene oxide with the strong degree of oxidization and the mixed slurry of the strong and weak graphene oxides respectively, the 31 μm graphene heat-conducting film is finally obtained from the slurry of the graphene oxide with the strong degree of oxidization, and a 72 μm graphene heat-conducting film is finally obtained from the mixed slurry of the strong and weak graphene oxides.

BRIEF DESCRIPTION OF THE DRAWINGS

The drawings are used to provide a further understanding of the present invention and constitute a part of this description, are used to illustrate the present invention together with examples of the present invention, and do not constitute a limitation to the present invention. In the drawings.

DETAILED DESCRIPTION

Figure 1:
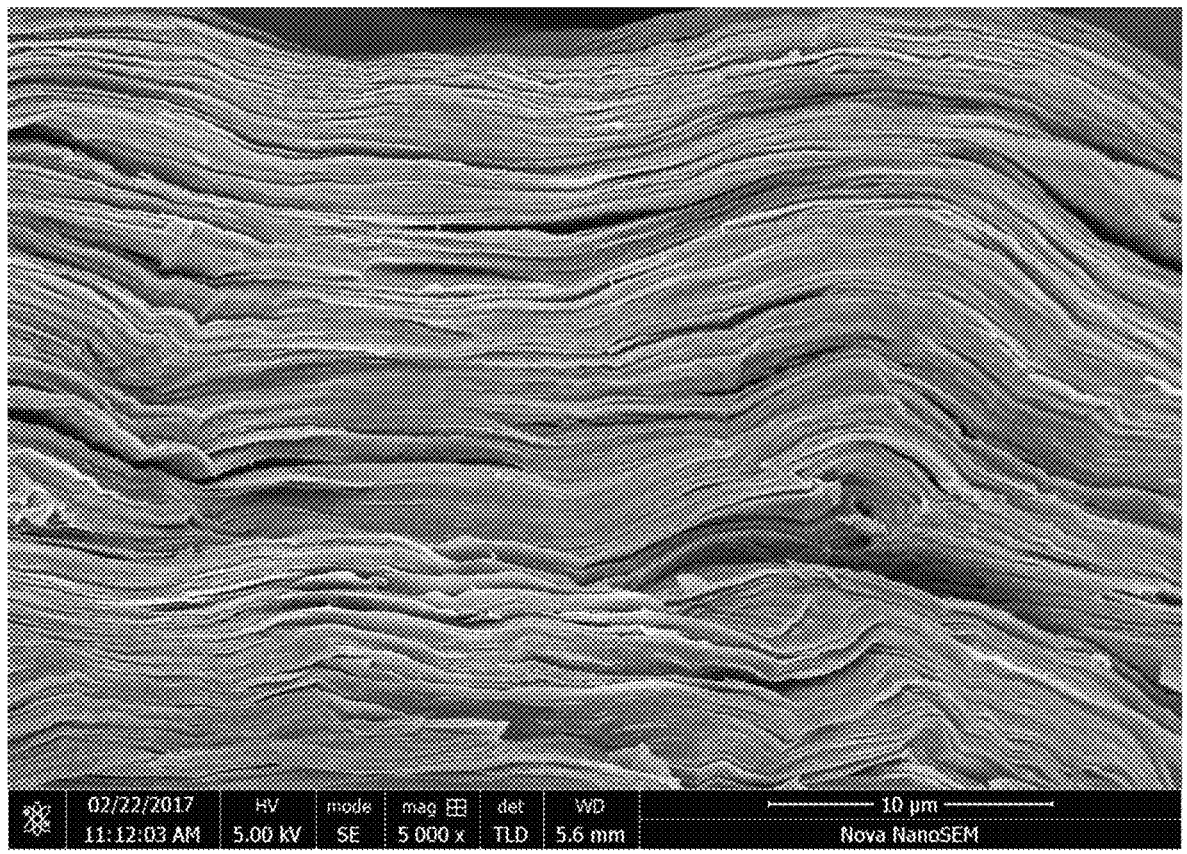
FIG. 1 is an SEM view of a graphene oxide film of Example 1.

In the following, only certain exemplary examples are briefly described. As will be recognized by those skilled in the art, the described examples can be modified in various ways without departing from the spirit or scope of the present invention. Accordingly, the drawings and description are regarded as illustrative in nature, and not restrictive.

The preferred examples of the present invention will be described below with reference to the drawings, and it should be understood that the preferred examples described herein are only used to illustrate and explain the present invention and not used to limit the present invention.

As a first embodiment of the present invention, a mixed slurry of strong and weak graphene oxides is shown and comprises graphene oxides and a solvent, and the graphene oxides include a strong graphene oxide and a weak graphene oxide. A solid content of the graphene oxide is 5-8%, for example: 5%, 5.2%, 5.4%, 5.5%, 5.8%, 6%, 6.2%, 6.5%, 6.8%, 7%, 7.2%, 7.5%, 7.8%, 8%, etc. The weak graphene oxide accounts for 5-50% of the graphene oxides by mass, for example: 5%, 6%, 7%, 8%, 9%, 10%, 15%, 20%, 25%, 30%, 35%, 40%, 42%, 45%, 48%, 49%, 50%, etc. A carbon content of the strong graphene oxide is 45-55%, for example: 45%, 46%, 47%, 48%, 49%, 50%, 51%, 52%, 53%, 54%, 55%, etc. A carbon content of the the weak graphene oxide is 80-90%, for example: 80%, 81%, 82%, 83%, 84%, 85%, 86%, 87%, 88%, 89%, 90%, etc. As a preferred embodiment, the weak graphene oxide accounts for 5-30% of the graphene oxides by mass, for example: 5%, 6%, 7%, 8%, 9%, 10%, 11%, 12%, 13%, 14%, 15%, 16%, 17%, 19%, 20%, 22%, 25%, 28%, 29%, 30%, etc. As an optimal embodiment, the weak graphene oxide accounts for 10-30% of the graphene oxides by mass, for example: 10%, 11%, 12%, 13%, 14%, 15%, 16%, 17%, 18%, 19%, 20%, 21%, 22%, 23%, 24%, 25%, 26%, 27%, 28%, 29%, 30%, etc. The carbon content of the weak graphene oxide is selected in a range of 80-90%, because a graphene oxide with an excessively high carbon content has a high number of layers during stripping, and orderliness becomes poor during assembling. The solvent includes one or a mixed solvent of two or more of water, NMP and DMF.

The strong graphene oxide of the present invention refers to a graphene oxide with a strong degree of oxidation, and the weak graphene oxide refers to a graphene oxide with a weak degree of oxidation.

The graphene oxide is obtained by adding some substances and structures between layers of graphite to strip away graphite sheet layers, and only to a certain degree of intercalation and oxidation can it be stripped to obtain very thin sheet layers (3 layers and below). The graphene oxide is high in degree of oxidation, large in number of oxygen-containing functional groups, thinner in sheet layer after striping, more orderly when being assembled into a film and better in assembly effect, but a carbon content of the strong graphene oxide is low, and graphene obtained after high-temperature treatment is relatively small in amount. A carbon content of the weak graphene oxide is high, and graphene obtained after high-temperature treatment is relatively large in amount; however, due to the weak degree of oxidation, it is only oxidized on an edge of a graphite sheet, a graphene oxide with a relatively small number of sheet layers cannot be obtained by stripping, and it is also very difficult to prepare a graphene oxide with a weak degree of oxidation and a small number of layers after stripping through experiments. The weak graphene oxide is low in degree of oxidation, small in number of oxygen-containing functional groups and large in number of layers during stripping, if only the weak graphene oxide is assembled for film formation, a highly oriented structure is not obtained during film formation, and orderliness is not good, thereby affecting the improvement of a heat-conducting coefficient of a graphene heat-conducting film obtained after high-temperature treatment.

It is very difficult to control the degree of oxidation in a preparation process of the graphene oxide. At present, it is difficult to prepare a graphene oxide with a degree of oxidation between a strong degree of oxidation and a weak degree of oxidation, and assembly of the graphene oxide during film formation can be affected and the heat-conducting coefficient of the graphene heat-conducting film prepared after final high-temperature treatment is greatly affected if the degree of oxidation of the graphene oxide slightly decreases. Therefore, selecting a graphene oxide with a single degree of oxidation is not compatible to obtain a graphene heat-conducting film with a large amount of residual graphene and a good heat-conducting property.

As a second embodiment of the present invention, a preparation method of a mixed slurry of strong and weak graphene oxides is shown, and specifically comprises the following steps:

preparing a strong graphene oxide dispersion liquid and a weak graphene oxide dispersion liquid respectively, mixing the strong graphene oxide dispersion liquid and the weak graphene oxide dispersion liquid, and dispersing to obtain the mixed slurry of the strong and weak graphene oxides.

Theoretically, the strong graphene oxide and the weak graphene oxide are not likely to be agglomerated in a solution because functional groups on a surface have negative charges —COOH and thus they repel each other. However, an agglomeration problem still occurs in actual production and the stability of an obtained slurry is still not ideal enough. After multi-directional analysis, the inventors of the present application find that agglomeration is not caused by problems such as a particle size, specific surface and oil absorption value of the graphene oxide, but the charge presented by the graphene oxide in the slurry affects a system. Since the graphene oxide dispersion liquid is acidic due to the —COOH group, it is necessary to add alkali into the dispersion liquid for neutralization during dispersing. If the two graphene oxides are directly mixed and then the alkali is added, since the two graphene oxides have different degrees of oxidation and different amounts of —COOH contained on their structures, when the alkali is added for neutralization, a reaction will be uneven, resulting in poor dispersing. By changing a process procedure, the two graphene oxides are first dispersed well respectively, the —COOH groups on the graphene oxides are fully neutralized, and then the two are mixed, thus avoiding the above-mentioned problem of uneven dispersing. Therefore, the two graphene oxides are first dispersed in the solvent respectively, and the —COOH of the graphene oxides is sufficiently neutralized, and then the two are mixed, so that the two graphene oxides in a mixed liquid are not likely to be agglomerated.

A preparation method of the strong graphene oxide dispersion liquid comprises: dispersing a graphene oxide prepared by a chemical oxidation method into the solvent to obtain the strong graphene oxide dispersion liquid. In the chemical oxidation method, graphite reacts in a strong acid solution with an oxidizing agent to obtain the graphene oxide. The chemical oxidation method comprises a Brodie method, a Staudenmaier method and a Hummers method.

In the strong graphene oxide dispersion liquid, a solid content of the strong graphene oxide is 3-8%, for example: 3%, 4%, 5%, 6%, 7%, 8%, etc. In the weak graphene oxide dispersion liquid, a solid content of the weak graphene oxide is 7-11%, for example: 7%, 8%, 9%, 10%, 11%, etc. Since the weak graphene oxide contains less oxygen-containing functional groups and bonds with less solvent, it is easier to obtain a high-concentration slurry; since the number of the layers of the weak graphene oxide after stripping is greater than the number of the layers of the strong graphene oxide after stripping, it is possible to obtain the weak graphene oxide dispersion liquid with a relatively high solid content.

A mixed liquid of the strong graphene oxide dispersion liquid and the weak graphene oxide dispersion liquid is dispersed at a high speed, and a linear velocity of dispersing is 50-300 m/s, for example: 50 m/s, 60 m/s, 70 m/s, 80 m/s, 90 m/s, 100 m/s, 120 m/s, 150 m/s, 180 m/s, 200 m/s, 220 m/s, 240 m/s, 250 m/s, 280 m/s, 290 m/s, 300 m/s, etc. As a preferred embodiment, the linear velocity of dispersing is 100 m/s.

As a third embodiment of the present invention, a composite film of strong and weak graphene oxides is shown and comprises a strong graphene oxide and a weak graphene oxide, a content of the weak graphene oxide is 5-50%, for example: 5%, 6%, 7%, 8%, 9%, 10%, 15%, 20%, 25%, 30%, 35%, 40%, 42%, 45%, 48%, 49%, 50%, etc. As a preferred embodiment, the content of the weak graphene oxide is 5-30%, for example: 5%, 6%, 7%, 8%, 9%, 10%, 12%, 15%, 18%, 19%, 20%, 21%, 24%, 25%, 28%, 29%, 30%, etc. As an optimal embodiment, the content of the weak graphene oxide is 10-30%, for example: 10%, 11%, 12%, 13%, 14%, 15%, 16%, 17%, 18%, 19%, 20%, 21%, 22%, 23%, 24%, 25%, 26%, 27%, 28%, 29%, 30%, etc.

Because a stripping degree of the strong graphene oxide is good, it can help the weak graphene oxide to assemble orderly; because the carbon content of the weak graphene oxide is high, the graphene heat-conducting film prepared from the composite film of the graphene oxides per unit mass increases, and cost is saved. If only the strong graphene oxide is used to prepare the graphene heat-conducting film, the heat-conducting coefficient of the finally obtained graphene heat-conducting film is high, but a thickness of the graphene heat-conducting film is small; if only the weak graphene oxide is used to prepare the graphene heat-conducting film, or the content of the weak graphene oxide is too high, since it is very difficult to strip the graphene oxide with the weak degree of oxidization to obtain a graphene oxide with a small number of layers (less than 10 layers), the orderliness during assembly is not good, and the heat-conducting coefficient of the graphene heat-conducting film after final heat treatment is low; if only a graphene oxide with an intermediate degree of oxidization is used, the degree of oxidization thereof is lower than that of the strong graphene oxide, and the assembly of the graphene oxide is affected due to reduction of the degree of oxidization, eventually resulting in that the heat-conducting coefficient of the graphene heat-conducting film after heat treatment is low. Therefore, by selecting the content of the weak graphene oxide to be 5-50%, the graphene heat-conducting film with a relatively high heat-conducting coefficient and a relatively high residual proportion of carbon can be obtained, so that the cost can be reduced to the maximum extent.

A grammage of the composite film of the graphene oxides is 100-250 $g/m^2$, for example: 100 $g/m^2$, 110 $g/m^2$, 120 $g/m^2$, 140 $g/m^2$, 150 $g/m^2$, 180 $g/m^2$, 200 $g/m^2$, 220 $g/m^2$, 230 $g/m^2$, 240 $g/m^2$, 250 $g/m^2$, etc. As a preferred embodiment, the grammage of the composite film of the graphene oxides is 180 $g/m^2$. A carbon content of the strong graphene oxide is 45-55%, for example: 45%, 46%, 47%, 48%, 49%, 50%, 51%, 52%, 53%, 54%, 55%, etc. A carbon content of the weak graphene oxide is 80-90%, for example: 80%, 81%, 82%, 83%, 84%, 85%, 86%, 87%, 88%, 89%, 90%, etc. The strong graphene oxide and the weak graphene oxide of the composite film of the graphene oxides are directionally arranged in plane. In-plane directional arrangement means that the graphene oxide is assembled into the film by hydrogen bonds, and is directionally arranged in an assembled plane, so that heat of the graphene heat-conducting film after heat treatment can be transmitted in a direction of directional arrangement of graphene.

As a fourth embodiment of the present invention, a preparation method of a composite film of strong and weak graphene oxides is shown and specifically comprises the following steps:

preparing a mixed slurry of the strong and weak graphene oxides by using the method in the second embodiment; and defoaming, coating and drying the slurry to form the composite film of the strong and weak graphene oxides.

A continuous on-line defoaming machine is used for defoaming, and a rotating speed is 2000-3000 r/min, for example: 2000 r/min, 2100 r/min, 2200 r/min, 2300 r/min, 2400 r/min, 2500 r/min, 2600 r/min, 2700 r/min, 2800 r/min, 2900 r/min, 3000 r/min, etc. A feeding valve of the defoaming machine has an opening degree of 25-35%, for example: 25%, 26%, 27%, 28%, 29%, 30%, 31%, 32%, 33%, 34%, 35%, etc. As a preferred embodiment, the feeding valve of the defoaming machine has an opening degree of 30%. A vacuum negative pressure in the defoaming machine is 400-600 Pa, for example: 400 Pa, 420 Pa, 440 Pa, 450 Pa, 480 Pa, 490 Pa, 500 Pa, 520 Pa, 550 Pa, 580 Pa, 590 Pa, 600 Pa, etc. As a preferred embodiment, the vacuum negative pressure in the defoaming machine is 500 Pa. Methods of coating include slot die coating and knife coating. In a method of slot die coating, the slurry at a certain flow rate enters a die head inner cavity from an extruding head feeding port, and stable pressure is formed; finally the slurry is sprayed out of a die head slot outlet to be coated on a base material. Knife coating is a coating mode in which a scraping knife is adopted for performing coating so as to make a thick coating film. The mode of knife coating is preferably adopted and further preferably, a coating machine is adopted for performing knife coating. A thickness of a wet film formed by coating is 2-5 mm, for example: 2 mm, 2.2 mm, 2.5 mm, 2.8 mm, 3 mm, 3.2 mm, 3.5 mm, 3.8 mm, 4 mm, 4.2 mm, 4.5 mm, 4.8 mm, 5 mm, etc. As a preferred embodiment, the thickness of the wet film formed by coating is 3 mm. Since the carbon content of the weak graphene oxide is high, the carbon residue value of the final heat-conducting film can be increased, so that a thicker graphene heat-conducting film can be obtained in the case of the same thickness of graphene oxide coating. If it is needed to prepare a graphene heat-conducting film of the same thickness, by using the method of the present invention, the thickness of the wet film formed by coating can be made smaller, and film production cost can be greatly reduced and efficiency can be improved. A speed of coating is 1-2 m/min, for example: 1 m/min, 1.1 m/min, 1.2 m/min, 1.3 m/min, 1.4 m/min, 1.5 m/min, 1.6 m/min, 1.7 m/min, 1.8 m/min, 1.9 m/min, 2 m/min, etc. As a preferred embodiment, the speed of coating is 1.2 m/min. A temperature of drying is 50-100° C., for example: 50° C., 55° C., 60° C., 65° C., 70° C., 75° C., 80° C., 85° C., 90° C., 95° C., 100° C., etc.; time of drying is 0.5-1.5 h, for example: 0.5 h, 0.6 h, 0.7 h, 0.8 h, 0.9 h, 1.0 h, 1.1 h, 1.2 h, 1.3 h, 1.4 h, 1.5 h, etc.

As a fifth embodiment of the present invention, a graphene heat-conducting film is shown, and the heat-conducting coefficient of the graphene heat-conducting film is greater than 1000 W/m·K, for example: 1100 W/m·K, 1200 W/m·K, 1300 W/m·K, 1400 W/m·K, 1500 W/m·K, 1600 W/m·K, 1700 W/m·K, 1800 W/m·K, etc. A density of the graphene heat-conducting film is 1.9-2.1 $g/cm^3$, for example: 1.9 $g/cm^3$, 1.92 $g/cm^3$, 1.95 $g/cm^3$, 1.98 $g/cm^3$, 2.0 $g/cm^3$, 2.02 $g/cm^3$, 2.05 $g/cm^3$, 2.08 $g/cm^3$, 2.1 $g/cm^3$, etc. A thickness of the graphene heat-conducting film is 30-100 μm, for example: 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, etc.

As a sixth embodiment of the present invention, a preparation method of a graphene heat-conducting film is shown and comprises the following steps:

preparing a composite film of strong and weak graphene oxides by using the method in the fourth embodiment;

performing high-temperature treatment on the composite film; and compacting the composite film after high-temperature treatment to obtain the graphene heat-conducting film.

Because the carbon content of the composite film of the graphene oxides is high, the amount of the graphene heat-conducting film after high-temperature treatment is relatively large, which can greatly reduce the film production cost and improve the efficiency.

A method of performing high-temperature treatment on the composite film comprises: heating the composite film from a room temperature to 1000-3000° C., for example: 1000° C., 1200° C., 1500° C., 1800° C., 2000° C., 2200° C., 2500° C., 2800° C., 3000° C., etc.; and performing treatment for 5-15 h, for example, 5 h, 6 h, 7 h, 8 h, 9 h, 10 h, 11 h, 12 h, 13 h, 14 h, 15 h, etc. A heating rate is 0.2-5° C./min, for example: 0.2° C./min, 0.3° C./min, 0.4° C./min, 0.5° C./min, 0.8° C./min, 1° C./min, 1.5° C./min, 2° C./min, 2.5° C./min, 3° C./min, 3.5° C./min, 4° C./min, 4.5° C./min, 4.8° C./min, 4.9° C./min, 5° C./min, etc. As a preferred embodiment, at 100° C. or less, the heating rate is 1-1.5° C./min, for example: 1° C./min, 1.1° C./min, 1.2° C./min, 1.3° C./min, 1.4° C./min, 1.5° C./min, etc.; at more than 100° C. and 300° C. or less, the heating rate is 0.2-0.5° C./min, for example: 0.2° C./min, 0.3° C./min, 0.4° C./min, 0.5° C./min, etc.; at more than 300° C., the heating rate is 3-5° C./min, for example: 3° C./min, 3.2° C./min, 3.5° C./min, 3.8° C./min, 4° C./min, 4.2° C./min, 4.5° C./min, 4.8° C./min, 5° C./min, etc. A compacting pressure is 10-30 MPa, for example: 10 MPa, 11 MPa, 12 MPa, 14 MPa, 15 MPa, 18 MPa, 20 MPa, 22 MPa, 24 MPa, 25 MPa, 28 MPa, 29 MPa, 30 MPa, etc.

The advantages of the present invention are illustrated below by examples and comparative examples. In the following examples, a strong graphene oxide refers to a graphene oxide having a carbon content of 45-55%; a weak graphene oxide refers to a graphene oxide with a carbon content of 80-90%.

Example 1A

This example shows a preparation process of a mixed slurry of strong and weak graphene oxides, which specifically comprises the following steps.

Step (1): preparing a strong graphene oxide dispersion liquid, wherein 1 kg of strong graphene oxide is dispersed in 19 kg of deionized water to obtain the strong graphene oxide dispersion liquid with a solid content of 5%, with a total of 20 kg.

Step (2): preparing a weak graphene oxide dispersion liquid, wherein 0.2 kg of weak graphene oxide is dispersed in 1.8 kg of deionized water to obtain the weak graphene oxide dispersion liquid with a solid content of 10%, with a total of 2 kg.

Step (3): mixing the dispersion liquid obtained in step (1) and step (2), and dispersing at a high speed and at a linear velocity of 70 m/s to obtain a graphene oxide slurry with a solid content of 5.45%, the weak graphene oxide accounting for 16.7% of total solids by mass.

Example 1B

This example shows a preparation process for preparing a composite film of strong and weak graphene oxides by using the process of Example 1A, which specifically comprises the following steps.

Step (1): preparing a mixed slurry of graphene oxides by using the process of Example 1A.

Step (2): using a continuous on-line defoaming machine for defoaming the slurry in step (1), a rotating speed of the defoaming machine being 2400 r/min, a feeding valve having an opening degree of 30%, and a vacuum negative pressure being 500 Pa.

Step (3): using a coating machine for knife coating of the slurry after being defoamed in step (2), a thickness of a wet film formed by coating being 3 mm, and a speed of continuous coating being 1.2 m/min.

Step (4): drying the wet film after coating in step (3), a 16-section drying oven with a drying path length of 64 m being used for drying, and a temperature of each section of the drying oven being 60° C., 63° C., 65° C., 70° C., 75° C., 78° C., 80° C., 85° C., 85° C., 85° C., 85° C., 85° C., 78° C., 75° C., 70° C. and 60° C. respectively, so as to obtain a composite film of the strong and weak graphene oxides with a grammage of 180 g/m². It can be seen from FIG. 1 that using a small amount of weak graphene oxide does not affect a stacking effect when the graphene oxide is assembled, and the graphene oxide is stacked well.

Example 1C

This example shows a preparation process for preparing a graphene heat-conducting film by using the process of Example 1B, which specifically comprises the following steps.

Step (1): preparing a composite film of graphene oxides by using the process of Example 1B. Step (2): performing heat treatment on the composite film, heating to 100° C. at a rate of 1.5° C./min, then heating to 300° C. at a rate of 0.2° C./min, then heating to 3000° C. at a rate of 5° C./min, performing treatment for 1 h, and removing oxygen-containing functional groups of the composite film to obtain a graphene foam film with a thickness of 90 μm.

Step (3): increasing a density of the graphene foam film obtained in step (2) by compacting to obtain a graphene heat-conducting film having a density of 2.1 g/cm³, a heat-conducting coefficient of 1560 W/m·K and a thickness of 49 μm.

Example 2A

This example shows a preparation process of a mixed slurry of strong and weak graphene oxides, which specifically comprises the following steps.

Step (1): preparing a strong graphene oxide dispersion liquid, wherein 0.9 kg of strong graphene oxide is dispersed in 19.1 kg of deionized water to obtain the strong graphene oxide dispersion liquid with a solid content of 4.5%, with a total of 20 kg.

Step (2): preparing a weak graphene oxide dispersion liquid, wherein 0.35 kg of weak graphene oxide is dispersed in 4.65 kg of deionized water to obtain the weak graphene oxide dispersion liquid with a solid content of 7%, with a total of 5 kg.

Step (3): mixing the dispersion liquid obtained in step (1) and step (2), and dispersing at a high speed and at a linear velocity of 100 m/s to obtain a graphene oxide slurry with a solid content of 5%, the weak graphene oxide accounting for 28% of total solids by mass.

Example 2B

This example shows a preparation process for preparing a composite film of strong and weak graphene oxides by using the process of Example 2A, which specifically comprises the following steps.

Step (1): preparing a mixed slurry of graphene oxides by using the process of Example 2A.

Step (2): using a continuous on-line defoaming machine for defoaming the slurry in step (1), a rotating speed of the defoaming machine being 3000 r/min, a feeding valve having an opening degree of 28%, and a vacuum negative pressure being 500 Pa.

Step (3): using a coating machine for knife coating of the slurry after being defoamed in step (2), a thickness of a wet film formed by coating being 2 mm, and a speed of continuous coating being 2 m/min.

Figure 2:
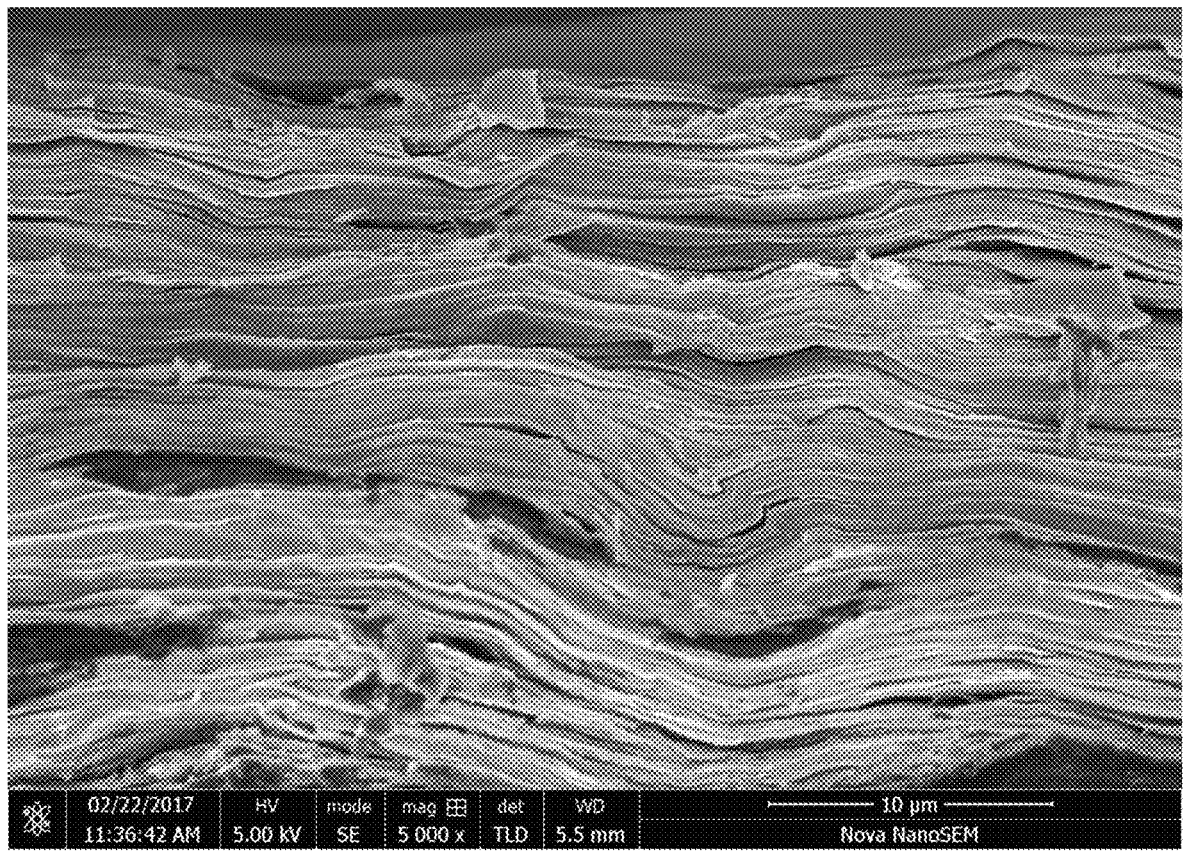
FIG. 2 is an SEM view of a graphene oxide film of Example 2.

Step (4): drying the wet film after coating in step (3), a 16-section drying oven with a drying path length of 64 m being used for drying, and a temperature of each section of the drying oven being 55° C., 60° C., 63° C., 65° C., 70° C., 75° C., 78° C., 80° C., 80° C., 80° C., 80° C., 80° C., 78° C., 75° C., 70° C. and 60° C. respectively, so as to obtain a composite film of the strong and weak graphene oxides with a grammage of 110 g/m². It can be seen from FIG. 2 that using a small amount of weak graphene oxide does not affect a stacking effect when the graphene oxide is assembled, and the graphene oxide is stacked well.

Example 2C

This example shows a preparation process for preparing a graphene heat-conducting film by using the process of Example 2B, which specifically comprises the following steps.

Step (1): preparing a composite film of graphene oxides by using the process of Example 2B.

Step (2): performing heat treatment on the composite film, heating to 100° C. at a rate of 1° C./min, then heating to 300° C. at a rate of 0.5° C./min, then heating to 2800° C. at a rate of 3° C./min, performing treatment for 1 h, and removing oxygen-containing functional groups of the composite film to obtain a graphene foam film with a thickness of 60 μm.

Step (3): increasing a density of the graphene foam film obtained in step (2) by compacting to obtain a graphene heat-conducting film having a density of 2.0 g/cm³, a heat-conducting coefficient of 1232 W/m·K and a thickness of 33 μm.

Example 3A

This example shows a preparation process of a mixed slurry of strong and weak graphene oxides, which specifically comprises the following steps.

Step (1): preparing a strong graphene oxide dispersion liquid, wherein 1.1 kg of strong graphene oxide is dispersed in 18.9 kg of deionized water to obtain the strong graphene oxide dispersion liquid with a solid content of 5.5%, with a total of 20 kg.

Step (2): preparing a weak graphene oxide dispersion liquid, wherein 0.96 kg of weak graphene oxide is dispersed in 11.04 kg of deionized water to obtain the weak graphene oxide dispersion liquid with a solid content of 8%, with a total of 12 kg.

Step (3): mixing the dispersion liquid obtained in step (1) and step (2), and dispersing at a high speed and at a linear velocity of 300 m/s to obtain a graphene oxide slurry with a solid content of 6.44%, the weak graphene oxide accounting for 46.6% of total solids by mass.

Example 3B

This example shows a preparation process for preparing a composite film of strong and weak graphene oxides by using the process of Example 3A, which specifically comprises the following steps.

Step (1): preparing a mixed slurry of graphene oxides by using the process of Example 3A.

Step (2): using a continuous on-line defoaming machine for defoaming the slurry in step (1), a rotating speed of the defoaming machine being 2800 r/min, a feeding valve having an opening degree of 30%, and a vacuum negative pressure being 500 Pa.

Step (3): using a coating machine for knife coating of the slurry after being defoamed in step (2), a thickness of a wet film formed by coating being 3.5 mm, and a speed of continuous coating being 1 m/min.

Figure 3:
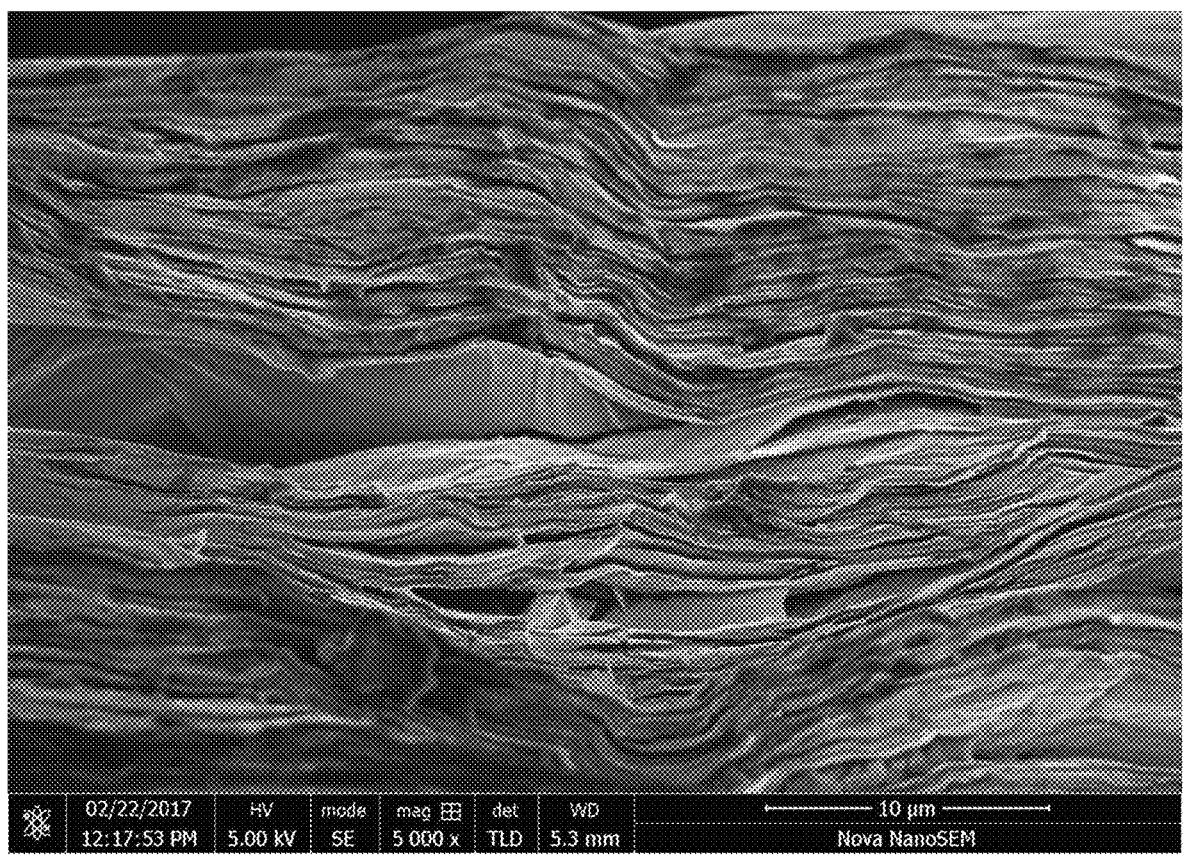
FIG. 3 is an SEM view of a graphene oxide film of Example 3.

Step (4): drying the wet film after coating in step (3), a 16-section drying oven with a drying path length of 64 m being used for drying, and a temperature of each section of the drying oven being 60° C., 63° C., 65° C., 75° C., 80° C., 85° C., 90° C., 95° C., 95° C., 95° C., 95° C., 95° C., 85° C., 75° C., 70° C. and 60° C. respectively, so as to obtain a composite film of the strong and weak graphene oxides with a grammage of 248 g/m². It can be seen from FIG. 3 that using a small amount of weak graphene oxide does not affect a stacking effect when the graphene oxide is assembled, and the graphene oxide is stacked well.

Example 3C

This example shows a preparation process for preparing a graphene heat-conducting film by using the process of Example 3B, which specifically comprises the following steps.

Step (1): preparing a composite film of graphene oxides by using the process of Example 3B.

Step (2): performing heat treatment on the composite film, heating to 100° C. at a rate of 1° C./min, then heating to 300° C. at a rate of 0.2° C./min, then heating to 2600° C. at a rate of 4° C./min, performing treatment for 1 h, and removing oxygen-containing functional groups of the composite film to obtain a graphene foam film with a thickness of 150 μm.

Step (3): increasing a density of the graphene foam film obtained in step (2) by compacting to obtain a graphene heat-conducting film having a density of 1.95 g/cm³, a heat-conducting coefficient of 1120 W/m·K and a thickness of 85 μm.

Comparative Example 4A

This comparative example shows a preparation process of a slurry of a graphene oxide with a strong degree of oxidization, which specifically comprises the following steps.

0.6 kg of strong graphene oxide is dispersed in 19.4 kg of deionized water to obtain a strong graphene oxide slurry with a solid content of 3%, with a total of 20 kg.

Comparative Example 4B

This comparative example shows a preparation process for preparing a graphene oxide film by using the process of Comparative Example 4A, which specifically comprises the following steps.

Step (1): preparing a graphene oxide slurry by using the process of Comparative Example 4A.

Step (2): using a continuous on-line defoaming machine for defoaming the slurry in step (1), a rotating speed of the defoaming machine being 2800 r/min, a feeding valve having an opening degree of 30%, and a vacuum negative pressure being 500 Pa.

Step (3): using a coating machine for knife coating of the slurry after being defoamed in step (2), a thickness of a wet film formed by coating being 4.5 mm, and a speed of continuous coating being 0.46 m/min.

Figure 4:
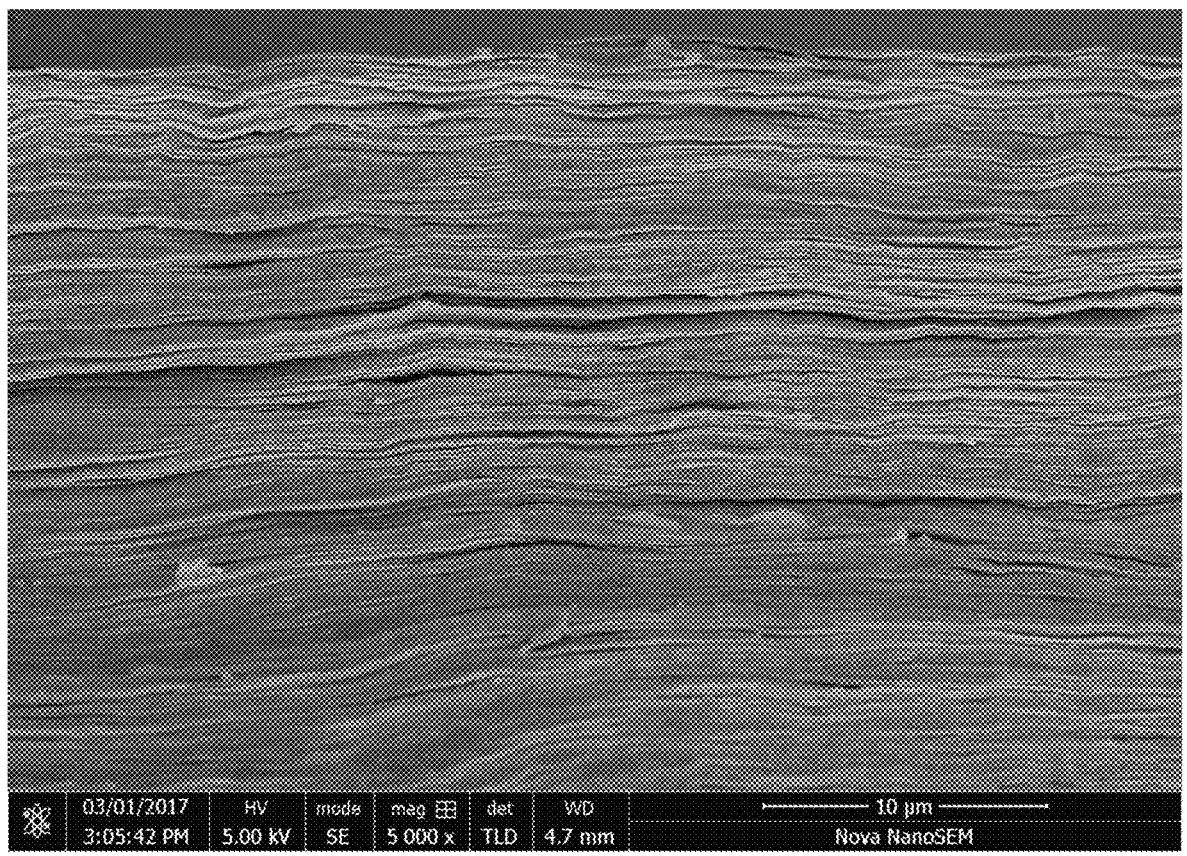
FIG. 4 is an SEM view of a graphene oxide film of Comparative Example 4.

Step (4): drying the wet film after coating in step (3), a 16-section drying oven with a drying path length of 64 m being used for drying, and a temperature of each section of the drying oven being 60° C., 63° C., 65° C., 75° C., 80° C., 80° C., 80° C., 80° C., 80° C., 80° C., 80° C., 80° C., 80° C., 75° C., 70° C. and 60° C. respectively, so as to obtain a graphene oxide film with a grammage of 135 g/m². It can be seen from FIG. 4 that by only using a strong graphene oxide, the graphene oxide is stacked well.

Comparative Example 4C

This comparative example shows a preparation process for preparing a graphene heat-conducting film by using the process of Comparative Example 4B, which specifically comprises the following steps.

Step (1): preparing a graphene oxide film by using the process of Comparative Example 4B.

Step (2): performing heat treatment on the graphene oxide film, heating to 100° C. at a rate of 1° C./min, then heating to 300° C. at a rate of 0.2° C./min, then heating to 2850° C. at a rate of 4° C./min, performing treatment for 1 h, and removing oxygen-containing functional groups of the graphene oxide film to obtain a graphene foam film with a thickness of 106 μm.

Step (3): increasing a density of the graphene foam film obtained in step (2) by compacting to obtain a graphene heat-conducting film having a density of 2.0 g/cm³, a heat-conducting coefficient of 1605 W/m·K and a thickness of 31 μm.

The 31 μm graphene heat-conducting film obtained in Comparative Example 4 obtained and the 33 μm graphene heat-conducting film obtained in Example 2 are substantially close in thickness, but when coating, Comparative Example 4 requires coating a thicker film, and the speed of coating is significantly reduced and the coating cost is high. For obtaining the graphene heat-conducting film with the same thickness, Comparative Example 4 needs a higher cost. By comparing Example 1 with Comparative Example 4, Example 1 has a relatively small effect on the heat-conducting coefficient by adding little weak graphene oxide.

Comparative Example 5A

This comparative example shows a preparation process of a slurry of a graphene oxide with a weak degree of oxidization, which specifically comprises the following steps.

1.4 kg of weak graphene oxide is dispersed in 18.6 kg of deionized water to obtain the weak graphene oxide slurry with a solid content of 7%, with a total of 20 kg.

Comparative Example 5B

This comparative example shows a preparation process for preparing a graphene oxide film by using the process of Comparative Example 5A, which specifically comprises the following steps.

Step (1): preparing a graphene oxide slurry by using the process of Comparative Example 5A.

Step (2): using a continuous on-line defoaming machine for defoaming the slurry in step (1), a rotating speed of the defoaming machine being 2800 r/min, a feeding valve having an opening degree of 30%, and a vacuum negative pressure being 500 Pa.

Step (3): using a coating machine for knife coating of the slurry after being defoamed in step (2), a thickness of a wet film formed by coating being 2 mm, and a speed of continuous coating being 2.3 m/min.

Figure 5:
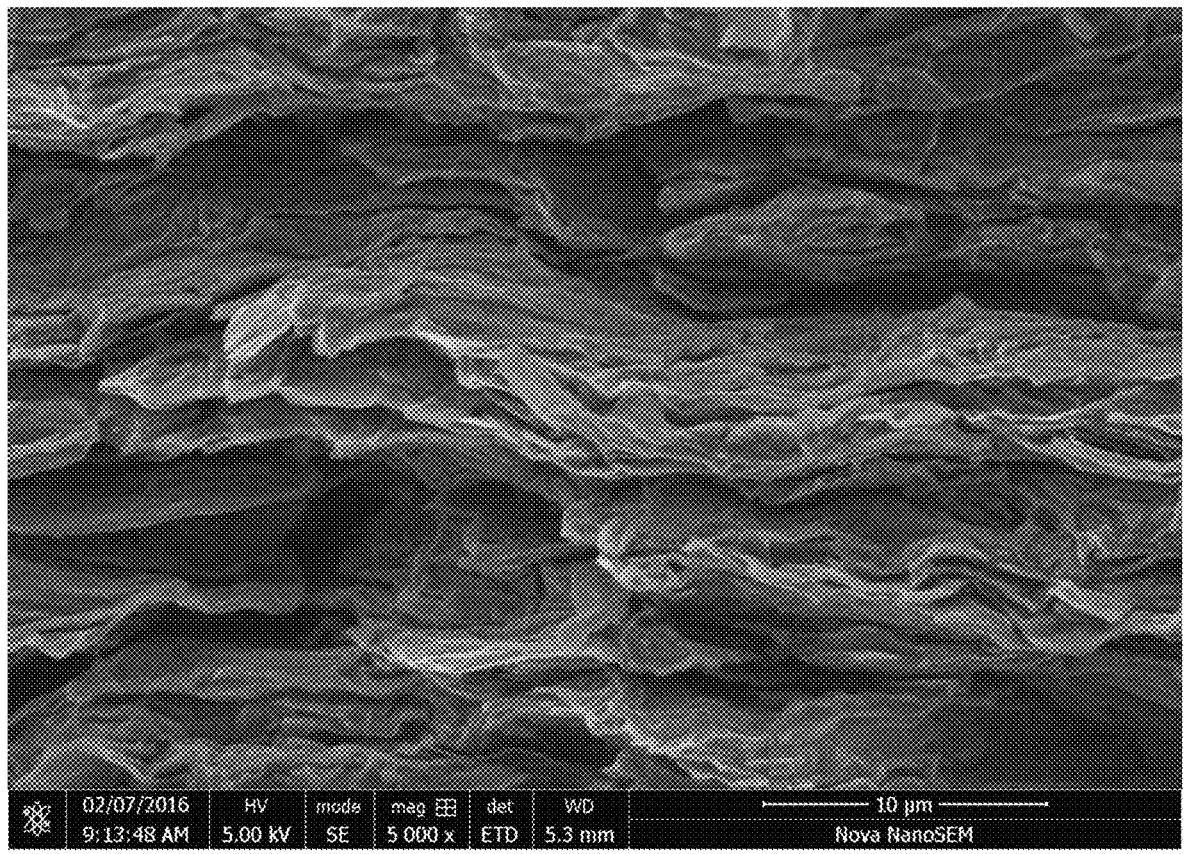
FIG. 5 is an SEM view of a graphene oxide film of Comparative Example 5.

Step (4): drying the wet film after coating in step (3), a 16-section drying oven with a drying path length of 64 m being used for drying, and a temperature of each section of the drying oven being 60° C., 63° C., 65° C., 75° C., 80° C., 85° C., 90° C., 95° C., 95° C., 95° C., 95° C., 95° C., 85° C., 75° C., 70° C. and 60° C. respectively, so as to obtain a graphene oxide film with a grammage of 140 g/m². It can be seen from FIG. 5 that by only using a weak graphene oxide to prepare the graphene oxide film, since the weak graphene oxide contains a small number of oxygen-containing functional groups, a number of stripped layers is small, and a stacking effect is not good in assembling.

Comparative Example 5C

This comparative example shows a preparation process for preparing a graphene heat-conducting film by using the process of Comparative Example 5B, which specifically comprises the following steps.

Step (1): preparing a graphene oxide film by using the process of Comparative Example 5B.

Step (2): performing heat treatment on the graphene oxide film, heating to 100° C. at a rate of 1° C./min, then heating to 300° C. at a rate of 0.2° C./min, then heating to 2800° C. at a rate of 4° C./min, performing treatment for 1 h, and removing oxygen-containing functional groups of the graphene oxide film to obtain a graphene foam film with a thickness of 80 μm.

Step (3): increasing a density of the graphene foam film obtained in step (2) by compacting to obtain a graphene heat-conducting film having a density of 2.0 g/cm³, a heat-conducting coefficient of 736 W/m·K and a thickness of 56 μm.

Since an assembly effect of the graphene oxide film in Comparative Example 5B is not good, the heat-conducting coefficient of the graphene heat-conducting film after final high-temperature treatment is low.

Finally, it should be noted that: what is described above is only preferred examples of the present invention, and is not used to limit the present invention, although the present invention has been described in detail with reference to the foregoing examples, those skilled in the art can still modify the technical solution described by each of the foregoing examples or perform equivalent replacement on part of technical characteristics therein. Any modification, equivalent replacement, improvement, etc. made within the spirit and principle of the present invention shall be included within the protection scope of the present invention.

The invention claimed is:

1. The preparation method of a graphene heat-conducting film, comprising the following steps:
  preparing a first dispersion liquid containing a strong graphene oxide and a second dispersion liquid containing a weak graphene oxide, wherein the strong graphene oxide has a carbon content of 45-55% and the weak graphene oxide has a carbon content of 80-90%;
  mixing the first dispersion liquid and the second dispersion liquid to obtain a slurry;

defoaming the slurry, coating the slurry on a surface to form a wet film, and drying the wet film to obtain a composite film;

performing high-temperature treatment to the composite film; and compacting the high-temperature treated composite film to obtain the graphene heat-conducting film.

2. The preparation method according to claim 1, further comprising reacting a graphite in a strong acid solution containing an oxide agent to obtain the strong graphene oxide.

3. The preparation method according to claim 1, wherein a solid content of the strong graphene oxide is 3-8% in the first dispersion liquid.

4. The preparation method according to claim 1, wherein a solid content of the weak graphene oxide is 7-11% in the second dispersion liquid.

5. The preparation method according to claim 1, wherein the slurry is dispersed at a linear velocity of 50-300 m/s.

6. The preparation method according to claim 1, wherein defoaming is carried out using a continuous on-line defoaming machine rotating at a speed of 2000-3000 r/min.

7. The preparation method according to claim 6, wherein the defoaming machine is operating at 400-600 Pa.

8. The preparation method according to claim 1, wherein the wet film is 2-5 mm in thickness.

9. The preparation method according to claim 1, wherein coating is carried out at a speed of 1-2 m/min.

10. The preparation method according to claim 1, wherein drying is carried out at a temperature of 50-100° C. and for a duration of 0.5-1.5 h.

11. The preparation method according to claim 1, wherein the high temperature treatment is carried out by keeping a temperature of the composite film at 1000-3000° C. for 5-15 h.

12. The preparation method according to claim 11, wherein Hall the temperature of the composite film is raised from room temperature to 1000-3000° C. at a heating rate of 0.2-5° C./min.

13. The preparation method according to claim 12, wherein the heating rate is 1-1.5° C./min when the temperature of the composite film is 100° C. or less, the heating rate is 0.2-0.5° C./min when the temperature of the composite film is between 100° C. and 300° C., and the heating rate is 3-5° C./min when the temperature of the composite film is above 300° C.

14. The preparation method according to claim 1, wherein the compacting is carried out at a compacting pressure of 10-30 MPa.

* * * * *